March 24, 1964  A. N. SALOMON  3,126,503
ELECTRICAL CAPACITOR AND ELECTRODE MATERIAL THEREFOR
Filed Dec. 5, 1960
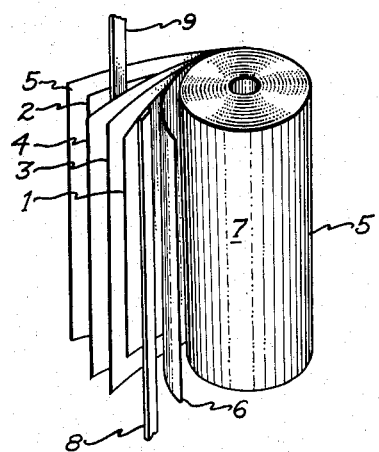
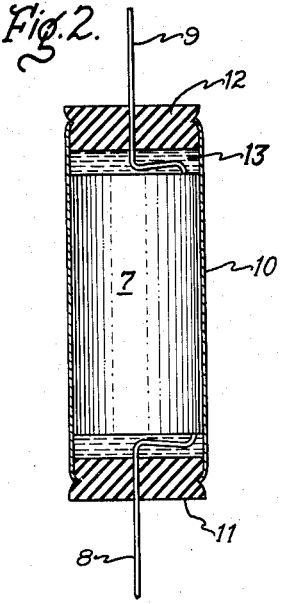
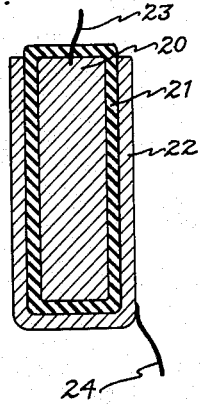
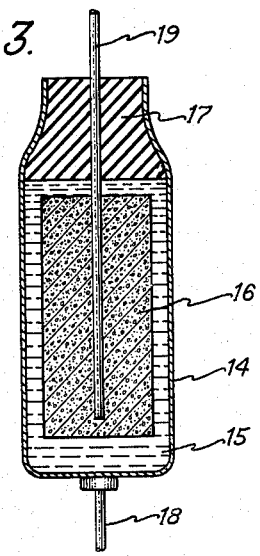
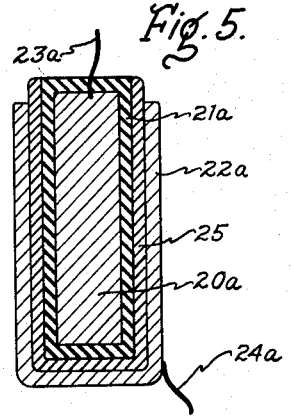
Inventor,
Allen N. Salomon,
by Sidney Greenberg
His Attorney.

United States Patent Office 3,126,503
Patented Mar. 24, 1964

3,126,503
ELECTRICAL CAPACITOR AND ELECTRODE
MATERIAL THEREFOR
Allen N. Salomon, Hudson Falls, N.Y., assignor to General Electric Company, a corporation of New York
Filed Dec. 5, 1960, Ser. No. 73,755
6 Claims. (Cl. 317—230)

The present invention relates to electrical capacitors and more particularly to novel electrode material therefor.

Electrical capacitors, especially those of the electrolytic type, commonly employ metal electrodes on which a thin dielectric oxide coating has been formed, usually by anodic formation. Since the capacitance of the capacitor is proportional to the dielectric constant of the dielectric layer, it is desirable to employ a dielectric oxide layer having as high a dielectric constant as possible to achieve a high level of capacitance without increasing the size of the capacitor, or in other words, to provide a capacitor having a high capacitance per unit volume.

Heretofore, the elemental metals aluminum and tantalum have been widely used in the electrolytic capacitor industry as dielectric oxide film-forming electrodes. Since it is well known that the presence of metallic impurities in the aluminum or tantalum tended to impair the film-forming properties of the electrode, it has been the practice in the prior art to employ aluminum or tantalum of as high degree of purity as is obtainable for the electrodes. The dielectric oxide films of pure aluminum electrodes have the disadvantage, however, of having a relatively low dielectric constant compared to tantalum oxide films. Furthermore, tantalum is often preferred to aluminum in making capacitor electrodes because of the greater mechanical strength of the tantalum, its high resistance to corrosion by the capacitor electrolyte and the improved electrical and mechanical stability of its dielectric oxide films. However, tantalum has the disadvantages of relatively high cost and greater weight as compared to aluminum.

Titanium has been considered heretofore for possible use as capacitor electrode material in view of the high dielectric constant of its oxide which is about ten times as high as the aluminum oxide dielectric and about five times as high as the oxide of tantalum. Titanium has other adavntages, such as good corrosion resistance, relatively low cost, and low density, and in these respects combines certain desirable features of aluminum and tantalum. However, it has been found that continuous oxide films for dielectric purposes cannot readily be formed to acceptable voltage levels on the titanium metal by conventional anodizing methods such as used in connection with aluminum, tantalum, and other known capacitor electrode metals. Furthermore, even when a dielectric film is formed, these films are generally not stable with the passage of time, and deteriorate rapidly even in air.

It is an object of the invention to provide electric capacitors having novel film-forming electrode material which overcomes the disadvantages of known capacitor electrode material.

It is another object of the invention to provide an improved titanium-containing capacitor electrode material.

It is a further object of the invention to provide titanium-containing capacitor electrode material which is characterized by good dielectric properties which are relatively stable with the passage of time, which has superior mechanical properties such as corrosion resistance and excellent workability, and which is readily provided with anodic dielectric oxide films.

Other objects and advantages will become apparent from the following description and appended claims.

With the above objects in view, the present invention relates to an electrical capacitor having a pair of metal electrodes, at least one of the electrodes comprising an alloy of titanium, vanadium, chromium, and aluminum, in the proportions hereinafter more fully disclosed, the electrode having formed on the surface thereof an oxide film serving as the capacitor dielectric layer.

The invention will be better understood from the following description and accompanying drawing in which:

FIG. 1 shows an electrolytic capacitor assembly of rolled type in which the invention may be embodied;

FIG. 2 shows the capacitor assembly of FIG. 1 arranged in a casing; and

FIGS. 3, 4 and 5 illustrate other types of capacitors to which the invention is applicable.

Referring now to the drawing, and particularly to FIG. 1, the capacitor shown comprises a pair of metal foils 1 and 2, one or both of which is composed of the titanium alloy of the present invention as hereinafter described and having a dielectric oxide film on the surface thereof, the foils in the operation of the capacitor having opposite polarity. Between foils 1 and 2 are one or more sheets of dielectric spacer material 3, 4, 5 and 6 composed conventionally of kraft paper or other suitable spacer material of a porous saturable nature used to separate the foils. Terminals or tap straps 8 and 9 are secured to the respective foils and extend from the foil in opposite directions. The electrode foils and dielectric sheets are wound into a compact roll 7 prior to insertion into a casing as shown in FIG. 2.

In FIG. 2 the capacitor roll assembly 7 is enclosed in a metal casing 10 with terminals 8 and 9 extending respectively through insulating plugs or discs 11, 12 fluid-tightly sealing the interior of the casing. A suitable electrolyte 13 such as an aqueous ammonium pentaborateglycol solution fills the casing and impregnates the porous spacer material.

FIG. 3 shows a different type of electrolytic capacitor comprising a casing 14 serving as the cathode and containing an electrolyte 15 in which an anode 16 is immersed. Casing 14 may be silver or any metal which does not adversely affect the fill electrolyte or become corroded thereby. In this embodiment, the anode 16 is formed of the titanium alloy of the present invention by powder metallurgy techniques, wherein particles of the alloy are pressed and vacuum-sintered into a porous compact mass or slug in accordance with known processes to provide a large surface area. A film-forming lead wire 19 made from the alloy, or aluminum, tantalum or other film-forming metal is embedded in the slug anode 16 and passes to the exterior of casing 14 through an insulating sealing disc or plug 17 around which casing 14 is crimped to provide a fluid-tight closure for the capacitor. At the opposite end of the capacitor, cathode lead 18 is suitably joined by welding or otherwise to the outside of casing 14.

Slug anode 16 of the FIG. 3 capacitor as well as one or both foils 1, 2 of the FIG. 1 capacitor are preferably provided with thin anodic dielectric oxide films in accordance with anodizing processes well known in the art.

FIG. 4 diagrammatically shows in exaggerated scale a so-called dry-type capacitor which may embody the invention and which comprises a base electrode 20 composed of the titanium alloy of the invention, an anodic dielectric oxide film 21 overlying the base electrode, and a counter electrode 22 in the form of a thin metal coating overlying oxide film 21 and spaced thereby from base electrode 20. Electrode layer 22 may be composed of any suitable conducting material such as aluminum, gold, tin, lead, zinc, or the equivalent, and may be applied by any metallizing or other suitable depositing procedure.

Leads 23 and 24 are attached by any suitable means to electrodes 20 and 22, respectively.

FIG. 5 shows a dry-type capacitor similar to that of FIG. 4 except that a layer 25 of semi-conductor material such as $MnO_2$ is interposed between the dielectric oxide layer 21a and the counter electrode 22a, the base electrode 20a also being composed of a titanium alloy in accordance with the invention.

The base electrode material of the dry-type capacitors of the FIGS. 4 and 5 embodiments, instead of being of solid, integral form as shown, may be composed of a compacted, sintered mass of particles of the titanium alloy, similar to the form of anode shown in FIG. 3. The counter electrodes of these capacitors may, if desired, be made of combined or composite layers. For example, in the semi-conducting layer embodiment graphite may be deposited over the semi-conducting layer prior to deposition of an outer metallic conducting layer on the graphite.

In accordance with the present invention, at least one of the capacitor electrodes, and more particularly the anode, is composed of an alloy of titanium with vanadium, chromium, and aluminum, with titanium being present in preponderant amount. Specifically, an alloy found suitable in accordance with the invention contains the ingredients in the following approximate proportions: 73% titanium, 13% vanadium, 11% chromium, and 3% aluminum. These proportions may, however, vary somewhat while still producing satisfactory results in accordance with the invention.

The titanium alloy of the invention provides unexpectedly good results for capacitor application especially when it is considered that anodically formed titanium oxide films are characterized by relatively poor electrical properties such as leakage current, power factor, and stability of capacitance with time. The good film-forming properties of the titanium alloy are further surprising in view of the fact that the vanadium and chromium ingredients themselves do not form a dielectric oxide film. It is also of interest in this connection to note that whereas it has been generally the trend in the art to improve the film-forming characteristics and dielectric properties of metal oxide films by the use of more purified electrode metals, the present invention shows that improved results may be obtained by alloying titanium with other metals.

The composition of the oxide films formed on the titanium alloy of the invention is not definitely known, and it has not been determined that the proportions of the metals in the dielectric oxide in fact match the composition of the base alloy. However, because of the superior dielectric properties observed for this alloy in comparison to the pure (unalloyed) component metals, it is conceivable that some form of mixed oxide of the alloy is produced.

Tests were made to determine the properties of the titanium alloy of the invention when used as a capacitor electrode, and to compare such properties with the conventionally-used metals tantalum and aluminum. In these tests, samples ½ inch by ½ inch in size were cut respectively from a 20 mil sheet of the above-described titanium alloy, a 0.5 mil sheet of commercial electrolytic grade tantalum foil, and a 2 mil sheet of commercial electrolytic grade aluminum foil. Specimens of the titanium alloy were vacuum heat treated; the tantalum and aluminum specimens were not heat treated but were cleaned according to conventional manufacturing technology. All the specimens were anodized to 20 volts and 50 volts by arranging them as the anodes in an electrolyte solution of phosphoric acid- water-ethylene glycol having a resistivity of 1,000 ohm-centimeters, the system having a silver cathode. After film-formation, the anodizing solution was removed, and the electrical properties, capacitance, dissipation factor, and leakage of the specimens were measured in an electrolyte comprising a solution of a borate, water and ethylene glycol having a resistivity of 250 ohm-centimeters. Leakage current was measured after a 5-minute electricification time at a voltage equal to 75% of the anodizing voltage. Leakage factor in terms of microamperes per volt-microfarad ($\mu a./v.-\mu f.$) was calculated from the observed data. The following table summarizes the results obtained:

*Table I*

| Sample | Formation Voltage | $\mu f./in.^2$ Capacitance | Change in Capacitance After 30 Minutes, percent | Percent D.F. | Leakage Factor $\mu a./v.-\mu f.$ |
| --- | --- | --- | --- | --- | --- |
| Ti-Alloy | 20 | 3.25 | −1.6 | 6.0 | .0045 |
| Tantalum | 20 | 3.95 | −0.8 | 8.5 | .0017 |
| Aluminum | 20 | 2.01 | −1.3 | 4.5 | .0314 |
| Ti-Alloy | 50 | 0.89 | −0.7 | 1.5 | .0096 |
| Tantalum | 50 | 1.69 | −2.8 | 4.0 | .0019 |
| Aluminum | 50 | 0.81 | −2.4 | 2.8 | .0200 |

As will be seen from the above data, at 20 volt formation the titanium alloy provided a capacitance of approximately 82% of tantalum and 162% of aluminum. Of particular significance is the superior leakage factor of .0045, a value practically equivalent to that of commercial grade electrolytic tantalum and considerably better than that associated with conventional electrolytic grade aluminum. The observed capacitance stability with time, which is usually very poor for pure titanium, is excellent for the titanium alloy, and is directly comparable with tantalum. The dissipation factor for the alloy is somewhat better than the tantalum electrode. The data for the 50-volt formation show the same trends as in the 20-volt process. Capacitance at this voltage is about 53% of tantalum and 110% of aluminum, with dissipation factor and capacitance stability with time both being somewhat better for the alloy than either the tantalum or aluminum samples.

The heat treatment of the titanium alloy samples prior to anodizing the samples as described above is for the purpose of removal of oxides and other impurities which might hinder the formation of anodic films of good electrical properties. Where the sample is essentially clean and free from such undesirable coatings and contaminants, the vacuum heat treatment may be omitted.

Aside from the above comparisons which show marked improvement of the present alloy material over conventional types of capacitor electrodes, the present alloy offers substantial benefits over the widely used tantalum electrodes principally because of the much lower density of the alloy material and its lower cost. Thus, tantalum has a specific gravity of about 16 whereas the specific gravity of the present titanium alloy is about 7. Taking into account the fact that tantalum itself at present costs about twice as much as the alloy material of the present invention, plus the saving due to the lower density of the alloy, it is quite apparent that a considerable cost reduction can be effected in the manufacture of electrolytic capacitors without sacrifice in the efficiency of operation of the capacitors. In addition, the much lower density of the titanium alloy as compared to tantalum makes it particularly useful in such applications as missile and other military fields where light weight is a critical factor.

A titanium alloy of the above-described composition suitable for use in practicing the invention is commercially available from the Crucible Steel Company which markets such an alloy under the designation of alloy B–120 VCA. The alloy has excellent bendability and formability, can be readily welded, can be heat-treated to high strength levels, and has other exceptional mechanical strength properties. The alloy has been rolled to a foil with a thickness of .001″ and presumably can be further reduced to substantially thinner gauges.

The alloy described may be prepared by the cold crucible inert arc melting technique commonly practiced in the titanium industry. The melting procedure is similar in principle to that described in "Metal Progress" volume 63 (1953), page 70, or "Review of Scientific Instruments" volume 25 (1954), page 596, or Transactions of American Institute of Mining and Metallurgical Engineers, volume 188 (1950), page 458.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising spaced electrodes, at least one of said electrodes comprising an alloy of approximately 73% titanium, 13% vanadium, 11% chromium, and 3% aluminum, at least said one electrode having formed thereon an anodic dielectric oxide film.

2. An electrical capacitor comprising, in combination, a pair of electrodes and an electrolyte in contact therewith, at least one of said electrodes comprising an alloy of approximately 73% titanium, 13% vanadian, 11% chromium, and 3% aluminum, said electrode having an anodic dielectric film formed thereon.

3. An electrical capacitor comprising a first electrode layer formed of an alloy of approximately 73% titanium, 13% vanadium, 11% chromium, and 3% aluminum, a dielectric oxide film formed on said first electrode layer, and a second electrode layer superposed on said dielectric oxide film and spaced thereby from said first electrode layer.

4. An electrical capacitor comprising a first electrode layer composed of an alloy of approximately 73% titanium, 13% vanadium, 11% chromium, and 3% aluminum, a dielectric oxide film formed on said electrode layer, a layer of semi-conductive material superposed on said dielectric oxide film, and a second electrode layer superposed on said layer of semi-conductive material and spaced by the latter and the dielectric oxide film from said first electrode layer.

5. An electrode for electrical capacitors comprising an alloy of approximately 73% titanium, 13% vanadium, 11% chromium, and 3% aluminum, said electrode having a dielectric oxide film formed thereon.

6. An electrode as defined in claim 5, wherein a layer of semi-conductive material overlies said dielectric oxide film.

References Cited in the file of this patent

UNITED STATES PATENTS

| | | |
|---|---|---|
| 1,933,301 | Auerback | Oct. 31, 1933 |
| 1,938,464 | Robinson | Dec. 5, 1933 |
| 2,504,178 | Burnham | Apr. 18, 1950 |